(12) United States Patent
Linan et al.

(10) Patent No.: US 11,130,476 B2
(45) Date of Patent: Sep. 28, 2021

(54) VEHICLE FLUID FILL SYSTEM

(71) Applicant: Ford Global Technologies, LLC, Dearborn, MI (US)

(72) Inventors: Eric Vargas Linan, Estado de Mexico (MX); Sebastian Pesado Fabrega, Mexico City (MX); Victor Manuel Gutierrez Lopez, Estado de Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/645,941

(22) PCT Filed: Sep. 20, 2017

(86) PCT No.: PCT/US2017/052429
§ 371 (c)(1),
(2) Date: Mar. 10, 2020

(87) PCT Pub. No.: WO2019/059900
PCT Pub. Date: Mar. 28, 2019

(65) Prior Publication Data
US 2020/0207314 A1    Jul. 2, 2020

(51) Int. Cl.
*B60S 5/00* (2006.01)
*B60H 1/00* (2006.01)
(Continued)

(52) U.S. Cl.
CPC ............ *B60S 5/00* (2013.01); *B60H 1/00585* (2013.01); *B67D 7/02* (2013.01); *B67D 7/04* (2013.01); *B67D 7/0401* (2013.01)

(58) Field of Classification Search
CPC ...... B60S 5/00; B60S 5/02; B60S 5/04; B67D 7/00; B67D 7/02; B67D 7/0205;
(Continued)

(56) References Cited

U.S. PATENT DOCUMENTS 3,527,268 A * 9/1970 Ginsburgh ............ B67D 7/0401
141/98
4,708,175 A * 11/1987 Janashak .............. B25J 15/0019
141/1
(Continued)

FOREIGN PATENT DOCUMENTS

JP     2001271500 A    10/2001

OTHER PUBLICATIONS

Kent, Jennifer. Connected Cars and the Smart Home: Crossover Use Cases. Parks Perspectives. Oct. 27, 2015. 2 pages.
(Continued)

*Primary Examiner* — Timothy L Maust
(74) *Attorney, Agent, or Firm* — Gregory P. Brown; Brooks Kushman P.C.

(57) ABSTRACT

A system includes a fill station, a vehicle, and a controller. The fill station has a first conduit. The vehicle has a subsystem that includes a second conduit configured to couple with the first conduit to establish a fluid connection between the subsystem and the fill station. The controller is programmed to, in response to a predetermined condition of the subsystem while the first and second conduits are coupled, automatically pump fluid from the fill station into the subsystem via the fluid connection.

20 Claims, 2 Drawing Sheets

(51) Int. Cl.
B67D 7/02 (2010.01)
B67D 7/04 (2010.01)

(58) Field of Classification Search
CPC .......... B67D 7/0401; B67D 2007/0403; B67D 2007/0417; B67D 2007/0423; B67D 2007/0425; B67D 2007/0426
USPC .......................................................... 141/98
See application file for complete search history.

(56) References Cited

U.S. PATENT DOCUMENTS

| | | | |
|---|---|---|---|
| 4,881,581 A * | 11/1989 | Hollerback | ............ B60K 15/04 141/113 |
| 6,003,568 A | 12/1999 | Strnad, Jr. | |
| 6,237,647 B1 | 5/2001 | Pong et al. | |
| 6,463,967 B1 * | 10/2002 | Boyle | .................. B67D 7/3209 141/100 |
| 6,499,343 B1 | 12/2002 | Haas et al. | |
| 6,711,474 B1 | 3/2004 | Treyz et al. | |
| 7,082,969 B1 * | 8/2006 | Hollerback | .............. B67D 7/04 141/38 |
| 7,891,387 B2 * | 2/2011 | Lim | ...................... A47L 9/2894 141/98 |
| 8,104,522 B2 * | 1/2012 | Flournoy | ............ F16H 57/0408 141/98 |
| 8,393,362 B1 * | 3/2013 | Hollerback | .............. B25J 11/00 141/94 |
| 8,499,393 B2 | 8/2013 | Ballester | |
| 9,169,114 B2 * | 10/2015 | Butler, Jr. | ............. G07F 13/025 |
| 2004/0103955 A1 * | 6/2004 | Awad | ........................ F01P 11/06 141/98 |
| 2004/0194852 A1 * | 10/2004 | Few | .......................... B60S 5/00 141/98 |
| 2005/0061394 A1 * | 3/2005 | Awad | .................... B60T 17/222 141/98 |
| 2006/0169350 A1 | 8/2006 | Hollerback | |
| 2011/0232801 A1 * | 9/2011 | Watkins | .................... B64F 1/28 141/1 |
| 2014/0167983 A1 | 6/2014 | Rude et al. | |
| 2014/0019149 A1 | 7/2014 | Junke et al. | |
| 2014/0379155 A1 | 12/2014 | Niizuma | |
| 2020/0207314 A1 * | 7/2020 | Linan | ................. B60H 1/00585 |

OTHER PUBLICATIONS

Stoklosa, Alexander. Hyundai's Mobility Vision Concept Makes the Car Part of the Home. Car and Driver. Jan. 5, 2017. 5 pages.
Pinter, Dave. The design study, which debuted at CES 2017, envisions the car as a, mobile room to meet a wide range of needs. Jan. 16, 2017.
PCT Examination Report PCT/US2017/052429 Filed Dec. 4, 2017, 9 pages.
International Search Report of the International Searching Authority for PCT/US2017/052429 dated Dec. 4, 2017.

* cited by examiner

VEHICLE FLUID FILL SYSTEM

CROSS-REFERENCE TO RELATED APPLICATIONS

This application is the U.S. National Phase of PCT Application PCT/US2017/052429 filed Sep. 20, 2017, the disclosure of which is hereby incorporated in its entirety by reference herein.

TECHNICAL FIELD

The present disclosure relates to a fluid fill system for a vehicle.

BACKGROUND

Vehicle subsystems may include various operating fluids such as coolants, lubricants, hydraulic fluids, etc.

SUMMARY

A vehicle includes a subsystem and a controller. The subsystem has a first conduit configured to couple with a second conduit on a fill station to establish a fluid connection between the subsystem and the fill station. The controller is programmed to, in response to a predetermined condition of the subsystem while the first and second conduits are coupled, automatically pump fluid from the fill station into the subsystem via the fluid connection.

A method includes parking a vehicle adjacent to a fill station such that a first conduit of a vehicle subsystem couples with a second conduit on the fill station to establish a fluid connection between the subsystem and the fill station, and automatically pumping fluid from the fill station into the subsystem via the fluid connection in response to a predetermined condition of the subsystem.

A system includes a fill station, a vehicle, and a controller. The fill station has a first conduit. The vehicle has a subsystem that includes a second conduit configured to couple with the first conduit to establish a fluid connection between the subsystem and the fill station. The controller is programmed to, in response to a predetermined condition of the subsystem while the first and second conduits are coupled, automatically pump fluid from the fill station into the subsystem via the fluid connection.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
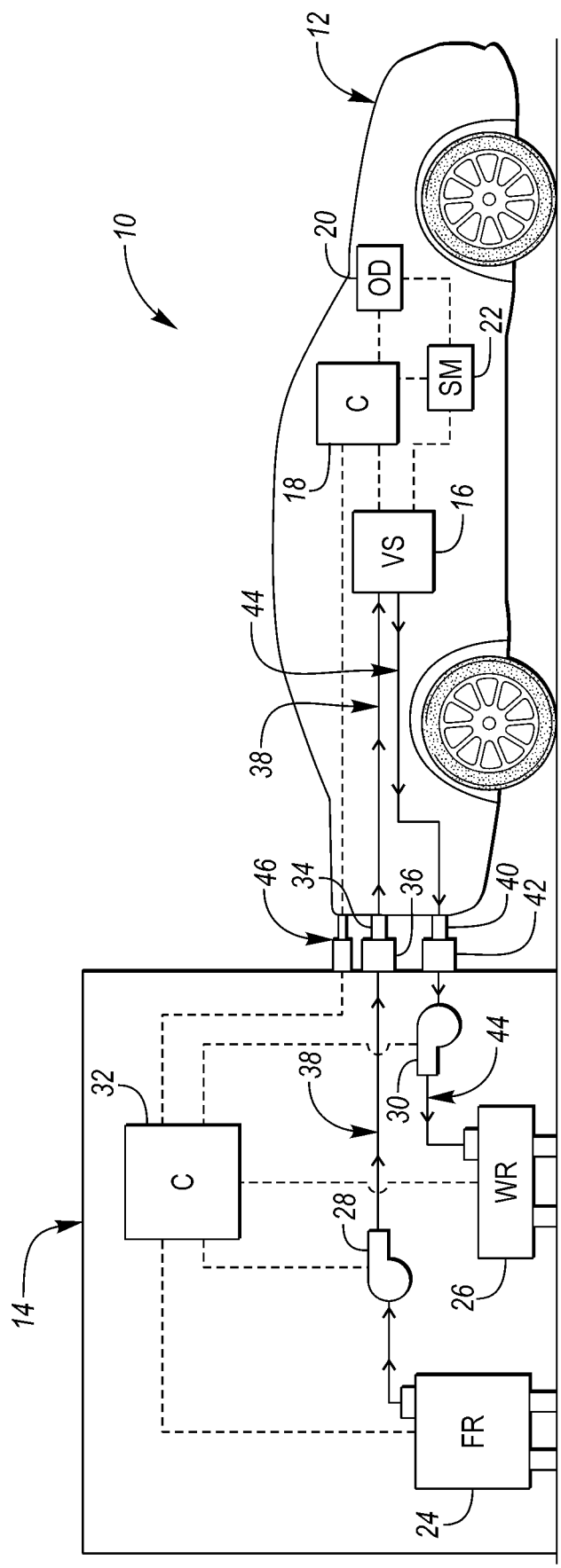
FIG. 1 is a schematic illustration of fluid fill system including a representative vehicle coupled to a fluid fill station.

Referring to FIG. 1, a fluid fill system 10 that includes a vehicle 12 and a fluid fill station 14 is illustrated. The vehicle 12 includes a vehicle subsystem 16 that requires an operating fluid. Operating fluids may include fluids that are either in a liquid or a gaseous state. For example, the vehicle subsystem 16 may be an engine that requires oil and/or coolant, a transmission that requires hydraulic fluid or transmission oil, an air-conditioning system that requires refrigerant, a braking system that requires hydraulic fluid or brake fluid, a power steering system that requires hydraulic or power steering fluid, a tire that requires air, or any other subsystem of the vehicle that requires an operating fluid. The vehicle subsystem 16 may include sensors that measure various conditions of the operation fluid, such as the level of the operating fluid, temperature of the operating fluid, pressure of the operating fluid, the amount of particulate matter within the operating fluid, viscosity of the operating fluid, etc. The sensors of the vehicle subsystem 16 may communicate the various states or conditions of the subsystem 16 and/or the operating fluid of the subsystem 16 to a vehicle controller 18. The vehicle 12 may also include a device, such as an odometer 20, that measures the usage or mileage of the vehicle 12.

A service monitoring module 22 may measure the usage of the vehicle 12 or the amount of time that has elapsed after maintenance has been performed on the vehicle subsystem 16. For example, the service monitoring module 22 may calculate the amount of time that has elapsed since the operating fluid has been changed or topped-off (i.e., new fluid being added to existing fluid in the vehicle subsystem 16). The service monitoring module 22 may also communicate with the odometer 20 to determine the amount of usage of the vehicle 12 that has occurred since the operating fluid has been changed or topped-off. The service monitoring module 22 may be an integral component of the vehicle controller 18. The service monitoring module 22 may be configured to automatically reset by monitoring the sensors of the vehicle subsystem 16 during a maintenance operation or may be manually reset by a user input into a control panel after a maintenance operation has been performed on the vehicle subsystem 16.

The fluid fill station 14 includes a fluid reservoir 24 that stores an unused operating fluid that may be pumped into the vehicle subsystem 16 to replace or top-off the existing operating fluid currently in the vehicle subsystem 16. The operating fluid in the fluid reservoir 24 may be any of the operating fluids of the vehicle 12 described above. The fluid fill station 14 may include a waste reservoir 26 that stores used operating fluid that has been pumped out the vehicle subsystem 16. The fluid fill station 14 may include a first pump 28 that is configured to pump operating fluid from the fluid reservoir 24 into the vehicle subsystem 16. The fluid fill station 14 may include a second pump 30 that is configured to pump used operating fluid from the vehicle subsystem 16 into the waste reservoir 26. The fluid reservoir 24 in the waste reservoir 26 may include sensors that that measure the fluid levels within each reservoir. The sensors in the fluid reservoir 24 and waste reservoir 26 may communicate the fluid levels within each reservoir to a fluid fill station controller 32. The first pump 28 and second pump 30 may also be in communication with and controlled by the fluid fill station controller 32.

The vehicle subsystem 16 may include a first conduit 34 that is configured to couple with the second conduit 36 on the fluid fill station 14 to establish a first fluid connection 38 between the vehicle subsystem 16 and the fluid fill station 14. More specifically, the first fluid connection 38 may be between the vehicle subsystem 16 and the fluid reservoir 24. The first fluid connection 38 may consist of the first conduit 34, the second conduit 36, a series of fluid channels or pipes that extend from the vehicle subsystem 16 to the first conduit 34, and a series of fluid channels or pipes (that may include the first pump 28) that extend from the fluid reservoir 24 to the second conduit 36.

The vehicle subsystem 16 may include a third conduit 40 that is configured to couple with the fourth conduit 42 on the fluid fill station 14 to establish a second fluid connection 44 between the vehicle subsystem 16 and the fluid fill station 14. More specifically, the second fluid connection 44 may be between the vehicle subsystem 16 and the waste reservoir 26. The second fluid connection 44 may consist of the third conduit 40, the fourth conduit 42, a series of fluid channels or pipes that extend from the vehicle subsystem 16 to the third conduit 40, and a series of fluid channels or pipes (that may include the second pump 30) that extend from the waste reservoir 26 to the fourth conduit 42.

The vehicle controller 18 may be electrically connected to the fluid fill station controller 32 by an electrical connection system 46 that may be established simultaneously with the first fluid connection 38 and the second fluid connection 44. The vehicle controller 18 may communicate various states or conditions of the subsystem 16 and/or the operating fluid of the subsystem 16 to the fluid fill station controller 32. In response to specific predetermined conditions of the vehicle subsystem 16 and/or the operating fluid of the vehicle subsystem 16, the fluid fill station controller 32 may then be configured to automatically pump (via the first pump 28) unused operating fluid from the fluid reservoir 24 to the vehicle subsystem 16 as long as the first fluid connection 38 remains established and/or to automatically pump (via the second pump 30) used operating fluid from the vehicle subsystem 16 to the waste reservoir 26 as long as the second fluid connection 44 remains established. The fluid fill station controller 32 may directly command any pumping operation or may relay a commanded pumping operation from the vehicle controller 18. The fluid fill station controller 32 may prevent unused operating fluid from being pumped from the fluid reservoir 24 to the vehicle subsystem 16 in the event that the fluid level within the fluid reservoir 24 is less than a threshold. The fluid fill station controller 32 may also prevent used operating fluid from being pumped from the vehicle subsystem to the waste reservoir 26 in the event that the fluid level within the waste reservoir 26 is greater than a threshold.

The predetermined conditions that may trigger a pumping operation (either from the fluid reservoir 24 to the vehicle subsystem 16 or from the vehicle subsystem 16 to the waste reservoir 26) may include, but are not limited to, a fluid level of the vehicle subsystem 16 being less than a threshold, a fluid level of the vehicle subsystem 16 being greater than a threshold, a time period elapsing after a previous fill of operating fluid from the fill station 14 to the vehicle subsystem 16, usage or mileage of the vehicle 12 exceeding a threshold after a previous fill of operating fluid from the fill station 14 to the vehicle subsystem 16, and an amount of particulate matter in the operating fluid exceeding a threshold amount. Some scenarios may require only pumping fluid from the fluid reservoir 24 to the vehicle subsystem 16 (e.g., where the fluid level of the vehicle subsystem 16 is less than a threshold while full replacement of the operating fluid is not required), while other scenarios may only require pumping fluid from the vehicle subsystem 16 to the waste reservoir 26 (e.g., where the fluid level of the vehicle subsystem 16 is greater than a threshold while full replacement of the operating fluid is not required). When full replacement of the operating fluid is required (e.g., due a time elapse or measured usage of the vehicle 12 exceeding a threshold after a previous maintenance operation has been performed on the vehicle subsystem 16) it may be desirable to simultaneously pump fluid from the fluid reservoir 24 to the vehicle subsystem 16 and fluid from the vehicle subsystem 16 to the waste reservoir 26. Alternatively, it may be desirable to pump used fluid from the vehicle subsystem 16 to the waste reservoir 26 until the subsystem 16 becomes empty followed by pumping a predetermined amount of unused fluid from the fluid reservoir 24 to the vehicle subsystem 16.

The vehicle controller 18 or the fluid fill station controller 32 may be part of a larger control system and may be controlled by various other controllers throughout the vehicle 12 or the fluid fill station 14, respectively. It should therefore be understood that the vehicle controller 18 or the fluid fill station controller 32 and one or more other controllers can collectively be referred to as a "controller" that controls various actuators in response to signals from various sensors to control functions the vehicle 12 or fluid fill station 14. The vehicle controller 18 or the fluid fill station controller 32 may each include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the vehicle controller 18 or the fluid fill station controller 32 in controlling the vehicle 12 or the fluid fill station 14, respectively.

Control logic or functions performed by the vehicle controller 18 or the fluid fill station controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Although FIG. 1 only depicts a first fluid connection 38 and second fluid connection 44 between a single vehicle subsystem 16, the disclosure should be construed to include one or more vehicle subsystems that include one or more fluid connections between the vehicle subsystem and the fluid fill station 14. For example, a fluid fill system may include two fluid connections between the engine at the fluid fill station 14 for exchanging coolant, two fluid connections between the engine and the fluid fill station 14 for exchanging oil, two fluid connections between the transmission and the fluid fill station 14 for exchanging transmission oil, two fluid connections between the air-conditioning system in the fluid fill station 14 for exchanging refrigerant, and two fluid connections between each tire in the fluid fill station for inflating the vehicle tires. Furthermore, the schematic in FIG. 1 is for illustrative purposes only. Some of the components of the vehicle 12 and/or fill station 14 may be positioned at different locations. For example, the first conduit 34, the third conduit 40, and/or the electrical connection system 46 may be located at the front or side of the vehicle 12.

Figure 2:
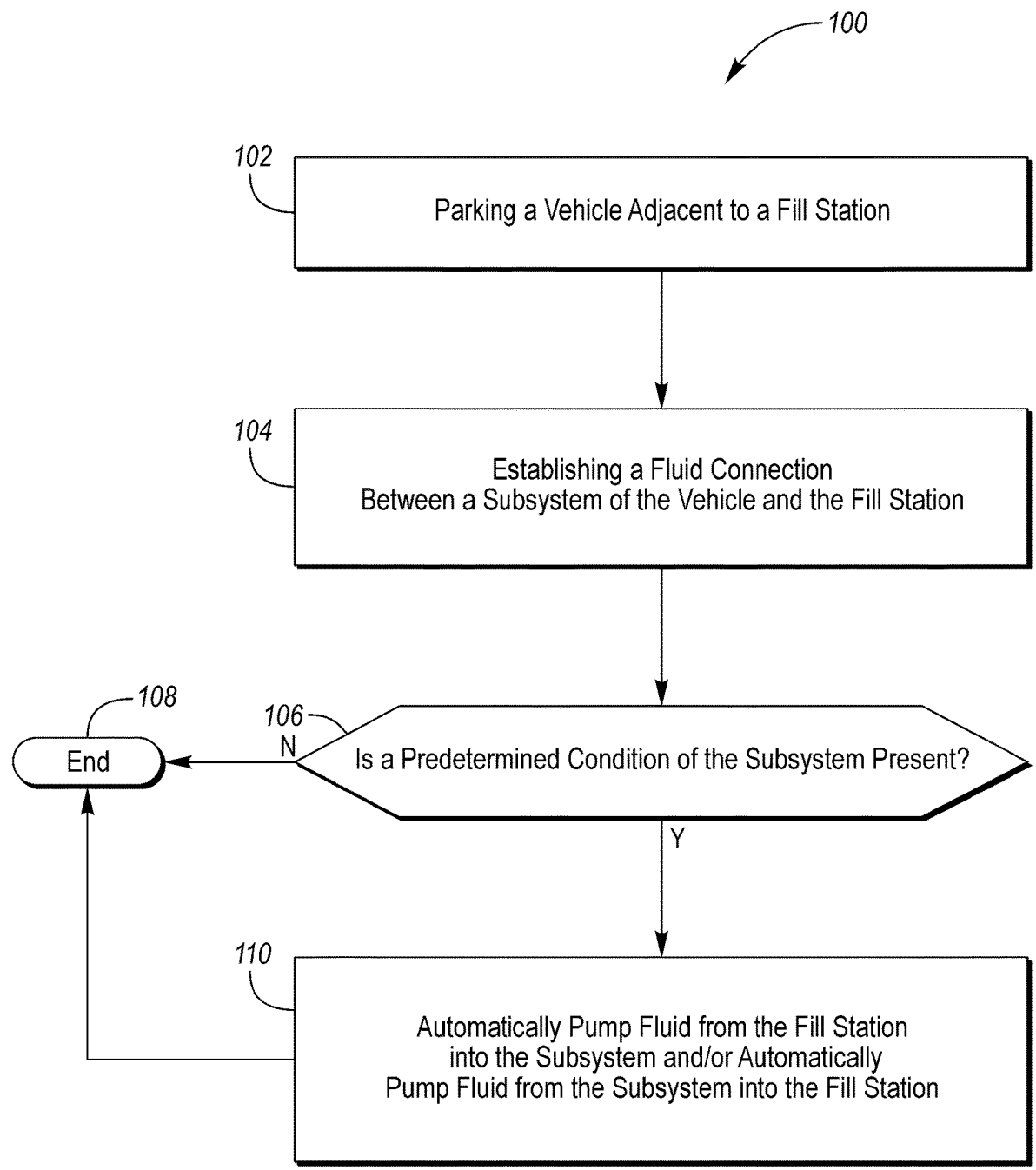
FIG. 2 is a flowchart illustrating a method of filling a subsystem of a vehicle with an operating fluid.

Referring to FIG. 2, a flowchart illustrating a method 100 of filling the vehicle subsystem 16 with an operating fluid is illustrated. The vehicle subsystem may be any of the vehicle subsystems described above. The method 100 begins at block 102 by parking the vehicle 12 adjacent to the fluid fill station 14. Next, the method 100 moves onto block 104 where a fluid connection between the vehicle subsystem 16 and the fluid fill station 14 is established (this is demonstrated above by the connection of the first conduit 34 on the vehicle 12 to the second conduit 36 on the fluid fill station 14 to establish the first fluid connection 38 and by the connection of the third conduit 40 on the vehicle 12 to the fourth conduit 42 on the fluid fill station 14 to establish the second fluid connection 44). Establishing the fluid connection between the vehicle subsystem 16 and the fluid fill station 14 may simultaneously be completed with the parking operation of the vehicle 12. This may include aligning the various conduits located on the vehicle 12 and fluid fill station 14 followed by advancing the vehicle 12 to a position where the various conduits on the vehicle 12 and the fluid fill station 14 become coupled to each other.

Once the fluid connection is established, the method 100 moves onto block 106 where it is determined if a predetermined condition of the vehicle subsystem 16 is present. The predetermined condition may include any of the predetermined conditions described above, including but not limited to, a fluid level of the vehicle subsystem 16 being less than a threshold, a fluid level of the vehicle subsystem 16 being greater than a threshold, a time period elapsing after a previous fill of operating fluid from the fill station 14 to the vehicle subsystem 16, the usage or mileage of the vehicle 12 exceeding a threshold after a previous fill of operating fluid from the fill station 14 to the vehicle subsystem 16 and an amount of particulate matter in the operating fluid exceeding a threshold amount. If it is determined that a predetermined condition of the vehicle 12 is not present at block 106, the method 100 ends at block 108. If it is determined that a predetermined condition of vehicle is present at block 106, the method 100 moves onto block 110 where unused operating fluid is automatically pumped from the fluid fill station 14 into the vehicle subsystem 16 and/or used operating fluid is automatically pumped from the vehicle subsystem 16 to the fluid fill station 14, as described above. The method then ends at block 108. It should be understood that the flowchart in FIG. 2 is for illustrative purposes only and that the method 100 should not be construed as limited to the flowchart in FIG. 2. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a subsystem having a first conduit configured to couple with a second conduit on a fill station to establish a fluid connection between the subsystem and the fill station; and
a controller programmed to,
position the vehicle to align the first conduit with the second conduit,
in response to aligning the first conduit with the second conduit, advance the vehicle to couple the first conduit to the second conduit and park the vehicle, and
in response to a predetermined condition of the subsystem while the first and second conduits are coupled, automatically pump fluid from the fill station into the subsystem via the fluid connection.

2. The vehicle of claim 1, wherein the subsystem includes a third conduit configured to couple with a fourth conduit on the fill station to establish a second fluid connection between the subsystem and the fill station, and wherein the controller is programmed to, in response to the predetermined condition while the third and fourth conduits are coupled, automatically pump fluid from the subsystem into the into the fill station via the second fluid connection.

3. The vehicle of claim 1, wherein the predetermined condition corresponds to vehicle mileage exceeding a threshold after a previous fill of fluid into the subsystem.

4. The vehicle of claim 1, wherein the predetermined condition corresponds to a time period elapsing after a previous fill of fluid into the subsystem.

5. The vehicle of claim 1, wherein the predetermined condition is a fluid level of the subsystem being less than a threshold.

6. The vehicle of claim 1, wherein the subsystem is an engine and the fluid is engine oil.

7. The vehicle of claim 1, wherein the subsystem is an engine and the fluid is engine coolant.

8. The vehicle of claim 1, wherein the subsystem is a transmission and the fluid is transmission oil.

9. The vehicle of claim 1, wherein the subsystem is an air conditioning system and fluid is refrigerant.

10. The vehicle of claim 1, wherein the subsystem is a vehicle tire and the fluid is air.

11. A method comprising:
positioning a vehicle adjacent to a fill station to align a first conduit of a vehicle subsystem with a second conduit on the fill station;
advancing the vehicle such that the first conduit of the vehicle subsystem couples with the second conduit on the fill station to establish a fluid connection between the subsystem and the fill station;
parking the vehicle in response to coupling the first conduit with the second conduit; and
automatically pumping fluid from the fill station into the subsystem via the fluid connection in response to a predetermined condition of the subsystem.

12. The method of claim 11, wherein a third conduit of the vehicle subsystem couples with fourth conduit on the fill station to establish a second fluid connection between the subsystem and the fill station when the vehicle is parked, and further comprising automatically pumping fluid from the subsystem into the fill station via the second fluid connection in response to the predetermined condition.

13. The method of claim 11, wherein the predetermined condition corresponds to vehicle mileage exceeding a threshold after a previous fill of fluid into the subsystem.

14. The method of claim 11, wherein the predetermined condition corresponds to a time period elapsing after a previous fill of fluid into the subsystem.

15. The method of claim 11, wherein the predetermined condition is a fluid level of the subsystem being less than a threshold.

16. A system comprising:
a fill station having a first conduit;
a vehicle having a subsystem that includes a second conduit configured to couple with the first conduit to establish a fluid connection between the subsystem and the fill station; and
a controller programmed to,
position the vehicle to align the second conduit with the first conduit,
in response to aligning the second conduit with the first conduit, advance the vehicle to couple the second conduit to the first conduit and park the vehicle, and
in response to a predetermined condition of the subsystem while the first and second conduits are coupled, automatically pump fluid from the fill station into the subsystem via the fluid connection.

17. The system of claim 16, wherein the subsystem includes a third conduit configured to dock with a fourth conduit on the fill station to establish a second fluid connection between the subsystem and the fill station, and wherein the controller is programmed to, in response to the predetermined condition while the third and fourth conduits are coupled, automatically pump fluid from the subsystem into the into the fill station via the second fluid connection.

18. The system of claim 16, wherein the predetermined condition corresponds to vehicle mileage exceeding a threshold after a previous fill of fluid into the subsystem.

19. The system of claim 16, wherein the predetermined condition corresponds to a time period elapsing after a previous fill of fluid into the subsystem.

20. The system of claim 16, wherein the predetermined condition is a fluid level of the subsystem being less than a threshold.

* * * * *